Sept. 27, 1938.  W. A. ANDERSON  2,131,361
COMPUTING MACHINE
Filed Dec. 22, 1932  5 Sheets-Sheet 1

Inventor
Walter A. Anderson
By Churchill Parker & Carlson
Attorneys

Sept. 27, 1938.  W. A. ANDERSON  2,131,361
COMPUTING MACHINE
Filed Dec. 22, 1932  5 Sheets-Sheet 2

POSITION AFTER A POSITIVE TOTAL HAS BEEN CONVERTED INTO A CREDIT BALANCE.

Inventor
Walter A. Anderson
By Churchill Parks
Karlow
Attorneys

Sept. 27, 1938.  W. A. ANDERSON  2,131,361
COMPUTING MACHINE
Filed Dec. 22, 1932  5 Sheets-Sheet 3

Patented Sept. 27, 1938

2,131,361

UNITED STATES PATENT OFFICE 2,131,361

COMPUTING MACHINE

Walter A. Anderson, Rockford, Ill., assignor, by mesne assignments, to Underwood Elliott Fisher Company, New York, N. Y., a corporation of Delaware Application December 22, 1932, Serial No. 648,347

10 Claims. (Cl. 235—60)

Application Serial No. 236,575, filed November 29, 1927 by Oscar J. Sundstrand, and application Serial No. 434,085, filed by me on March 7, 1930 (now Patents Nos. 1,946,505 and 1,975,774, respectively), disclose a computing machine having two totalizers, each of which may be used to add and subtract. Only one of these totalizers, however, is provided with means for automatically introducing the fugative unit and with means whereby said totalizer is automatically conditioned for the taking of a credit balance or negative total.

The present invention has for its object the provision of means whereby both totalizers shall be adapted to give the correct result when the amount is a negative one and whereby both of the totalizers shall be automatically conditioned for the taking of credit balances when they contain such amounts.

In the accompanying drawings

The invention is herein exemplified in a machine of the general character disclosed in the Sundstrand application Serial No. 670,665 filed October 25, 1923 (now Patent No. 1,965,611), the Sundstrand application Serial No. 118,628 filed June 26, 1926 (corresponding to French Patent No. 625,678), the Sundstrand applications Serial Nos. 236,575 and 355,747, filed November 29, 1927, and April 17, 1929, respectively, and my application Serial No. 434,085, filed March 7, 1930 (now Patents Nos. 1,946,505, 1,946,823 and 1,975,774, respectively). Reference may be made to the above-mentioned patents for an understanding of features not fully illustrated or described herein. It should, however, be understood that the present invention is not limited to machines of the Sundstrand type.

Printing is effected upon paper carried by the platen 2 by means of vertically reciprocatory type bars 3. These type bars are raised and lowered by means including two levers 19 (Figs. 1 and 5) pivoted at 19a. Links 23 are pivoted to the lower ends of the levers 19, the forward ends of said links being pivoted to two crank arms 24 and 25 (Figs. 1 and 5) fixed to opposite ends of a rock shaft 26. This shaft is arranged to be rocked by means of a handle 27 mounted to swing on the axis 28, the handle 27 being connected to the arm 24 by means which may be of any preferred character, as, for example, that shown in the Sundstrand Patent No. 1,611,390. It will, of course, be understood that an electric motor may be used to rock the shaft 26, if desired. When the operator pulls the handle 27 forward, the arms 24 and 25 swing upwardly, thereby drawing the lower ends of the levers 19 forwardly, the movement of said levers being yieldingly transquently, the cam 161 is not moved during the forward stroke of the handle 127, and the totalizer from which the total is to be printed remains in mesh with the racks during the rising of the latter, thereby effecting the positioning of the type bars for the printing of the total.

The means for controlling engagement of the pawl 166 with the pin 170 comprises an arm 173 pivoted at 174 in the machine frame, the upper end of said arm having an angular lug 175 adapted to hold the pawl 166 depressed out of position to engage said pin. In the arm 173 is an elongated opening 176 in which lies a pin 177 fixed to the swinging frame 48ᶜ. As explained in the Sundstrand Patent No. 1,583,102, as soon as a digit is set up in the machine, the frame 48ᶜ is forced back, thereby swinging the arm 173 rearwardly away from the pawl 166 and leaving said pawl in position to engage the pin 170 when the handle 27 is pulled. After a blank or spacing cycle has been performed preliminary to the taking of a total, the frame 48ᶜ is in its forward position and the pawl 166 is held out of engagement with the pin 170. Consequently, the cam 161 is not moved during the forward stroke of the handle 27 in the total-taking cycle, and the totalizer from which the total is to be taken remains in mesh with the racks during the rise of the latter, thus effecting the positioning of the type bars for the printing of the total.

A subtotal key 180 (Fig. 10) is carried by a stem 180ᵃ. On said stem is a pin 181 that overlies an arm 182 which is pivoted at 183. Rigid with the arm 182 is an arm 184 to which is pivoted the forward end of a slide 185. The rear end of said slide is guided to move forward and back in the machine frame. The slide 185 comprises a lug 188 which lies in front of a pin 189 on the swinging frame 48ᶜ. A spring 190 acting upon the arm 182 tends to move the slide 185 rearwardly so as to swing the frame 48ᶜ rearwardly against the tension of the springs 48ᵉ to place the detent plate 48ᵃ in position to prevent the type bars from rising. It will be seen that in order to take a subtotal it is necessary to depress the subtotal key 180 so that the springs 48ᵉ may be permitted to move the detent plate 48ᵃ forward out of the position in which it prevents the type bars from rising.

Figures 10, 10A, 11, 12:
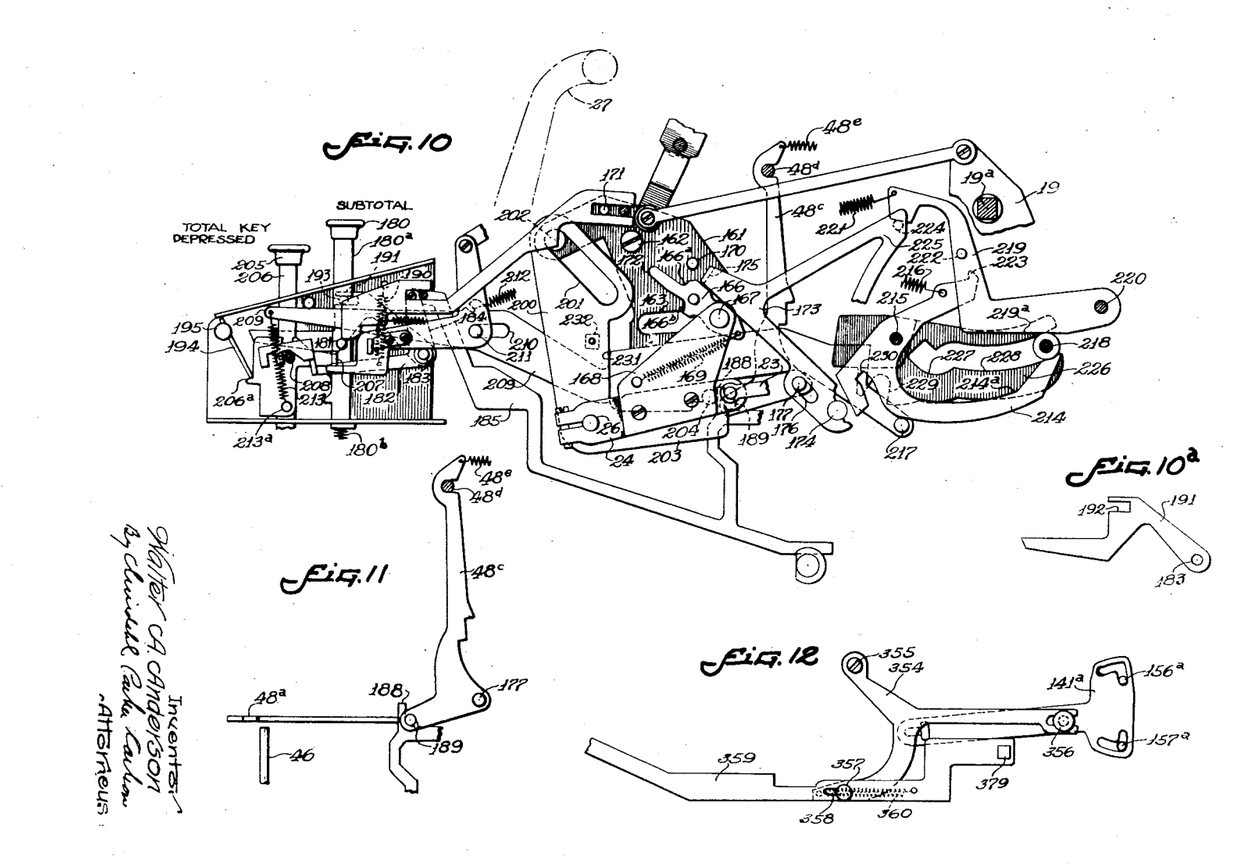
Fig. 10 is a fragmental right-hand side elevation showing principally the means for engaging and disengaging the totalizers and the racks in item-entering and total-taking operations.
Fig. 10a is a detail view of a lever shown in Fig. 10.
Fig. 11 is a detail view of a means for controlling the upward movement of the type bars.
Fig. 12 is a fragmental view of a means for positioning the totalizers for addition or subtraction.

To hold the subtotal key 180 depressed I provide a lever 191 (Figs. 10 and 10ᵃ) which is pivoted on the axis 183, said lever being forked at 192 to receive a pin 193 on the stem of the subtotal key. The lever 191 extends forward into position to underlie, when depressed, a finger 194 fixed to one end of a pivot shaft 195. On the other end of the shaft 195 is a finger 196 (Fig. 5) which is acted upon by a contractile spring 197. The lower end of the finger 196 normally bears against a roller 178 carried by a slide bar 199 that corresponds to the slide bar 72 of Patent No. 1,198,487. In the return stroke of the handle 27 the bar 199 is moved forward far enough to release the lever 191, whereupon the subtotal key 180 is restored to its upper position.

When the operator wishes to take a final total, the totalizer from which the total is to be taken is withdrawn from the racks before the latter descend. The means for swinging the cam 161 to effect such movement of the totalizer comprises a lever 200 (Fig. 1) pivoted on the shaft 26 and having a cam slot 201 in which lies a roller 202 on the cam 161. The lever 200 has an arm 203 which is arranged to be engaged by a pin 204 on the arm 24. The means for swinging the lever 200 forward to disengage the totalizer from the racks is controlled by a total key 205 having a stem 206. On the stem 206 is a lug 206ᵃ (Fig. 10) adapted to be engaged by the latch finger 194 to latch the total key down. Also on the stem 206 is an angular lug 207 that overlies the arm 182. The stem 206 also has a stud 208 that underlies the forward end of a lever 209. Said lever has an elongated opening 210 through which a pivot rod 211 extends, the lever 209 being thus movable longitudinally to a slight extent. A contractile spring 212 tends to slide the lever 209 rearwardly. 213 is a contractile spring stretched between a pin 213ᵃ on the total key stem 206 and the front end of the lever 209, said spring tending to move the stud 208 and the lever 209 toward each other. During the printing of an item and during the enforced blank or spacing stroke prior to the taking of a total, the lever 209 is held against movement by the spring 213 by means comprising a cam plate 214 which is pivoted adjacent the rear end of the machine at 215 and is acted upon by a contractile spring 216. On the rear end of the lever 209 is a pin 217 underlying the cam plate 214. The surface 214ᵃ of the cam plate 214 is arranged to be engaged by a stud 218 on the inner side of the right-hand lever 19. The movement of the cam plate 214 under the influence of the spring 216 is restrained at times by a detent arm 219 pivoted at 220 in the framework of the machine. A contractile spring 221 normally holds the lower edge 219ᵃ of the arm 219 in contact with the stud 218. On the detent arm 219 is a pin 222 adapted to engage a hook 223 on the cam plate 214. At times the detent arm 219 is prevented from moving (under the influence of the spring 221) into position where the pin 222 is in front of the hook 223, by means of a pin 224 on an arm 225 which is rigid with the arm 173. The upper end of the detent arm 219 is cut away so as to clear the pin 224 when the arm 175 is in its rearward position (as it is when an item has been set up or an enforced blank stroke is to be taken).

A detent plate 226 pivoted on the center 215 has a cam slot 227 having a dwell portion 228 in which the stud 218 is arranged to run. That portion of the pin 217 which projects from the inner side of the lever 209 underlies the plate 226. In the lower edge of the plate 226 is a notch 229.

It will be remembered that the stud 218 is connected to swing back and forth with the handle 27. Even if the total key 205 were held depressed while the handle was being drawn forward to print an item or take an enforced blank stroke, the lever 209 would be held against movement by the spring 213 by the cam plate 214 overlying the pin 217; the spring 216 in turn being prevented from moving the cam plate 214 by means of the pin 222. But after the blank stroke has been taken, the swinging frame 48ᶜ and consequently the arm 225 are in their forward positions (as shown in Fig. 10), and therefore if the total key 205 be depressed, the cam plate 214 is free to swing counterclockwise as the stud 218 moves forward, away from the edge 214ᵃ, in the forward stroke of the handle 27, until the pin 217 on the rear end of the lever 209 has risen under the influence of the spring 213 until said pin 217 is in a locking notch 230 in the cam plate 214. The parts are then in the position shown in Fig. 31 of the Sundstrand Patent No. 1,946,505, the handle 27 being at the end of its forward stroke, the spring 213 having drawn the forward end of the lever 209 down against the pin 208. The pin 217 does not enter the notch 230 until the movement of the cam plate 226 under the action of the stud 218 has brought the notch 229 into register with said pin 217 whereupon the spring 213 causes the pin 217 to enter the notches 229 and 230. Very shortly after the handle 27 has commenced its return stroke the stud 218, acting on the walls of the cam slot 227, swings the plate 226 downwardly, thus pushing the pin 217 and the lever 209 forwardly. On the lever 209 is a shoulder 231 (Fig. 10) which moves into place directly behind a pin 232 on the lever 200 when the lever 209 is tilted by the spring 213. When the lever 209 is pushed forward by the plate 226 the shoulder 231 pushes the lever 200 forward, thereby swinging the cam 161 upwardly, and thus pulling forward the slide 144 and the link 141 or 141a as the case may be, and consequently moving the totalizer (from which the total has been taken) out of mesh with the racks. As before indicated, this occurs during the early part of the return movement of the handle 27 and before the racks descend, the pinions being therefore left standing at zero.

As the stud 218 continues on its return stroke, it strikes the edge 214a and swings the plate 214 clockwise against the tension of the spring 216, the lower edge of said plate positively camming the pin 217 down and thus (in conjunction with spring 212) restoring the lever 209 to its initial or inoperative position. As the arm 24 returns to its initial position, the pin 204 thereon engages the arm 203 and restores the lever 200 to its initial position, as in Figs. 1 and 10.

The operation of the cam 161 which moves the totalizer or totalizers into and out of mesh with the racks may be summarized as follows:

Entering an item (additively or subtractively):
 Front stroke of handle—
  Cam 161 is swung up by pawl 166.
 Return stroke of handle—
  Near beginning of return stroke, cam 161 is swung down by pawl 166.
Non-addition:
 Front stroke—
  Cam 161 is swung up by pawl 166.
 Return stroke—
  Near end of return stroke cam 161 is swung down by pin 204, arm 203 and cam 209.
Taking a subtotal:
 Front stroke—
  Cam 161 remains down, pawl 166 being disabled by lug 175.
 Return stroke—
  Cam 161 remains down.
Taking a final total:
 Front stroke—
  Cam 161 remains down, pawl 166 being disabled by lug 175.
 Return stroke—
  Near beginning of return stroke, cam 161 is swung up by lever 209.
  Near end of return stroke, cam 161 is swung down by pin 204.

Figures 1, 1A, 1B:
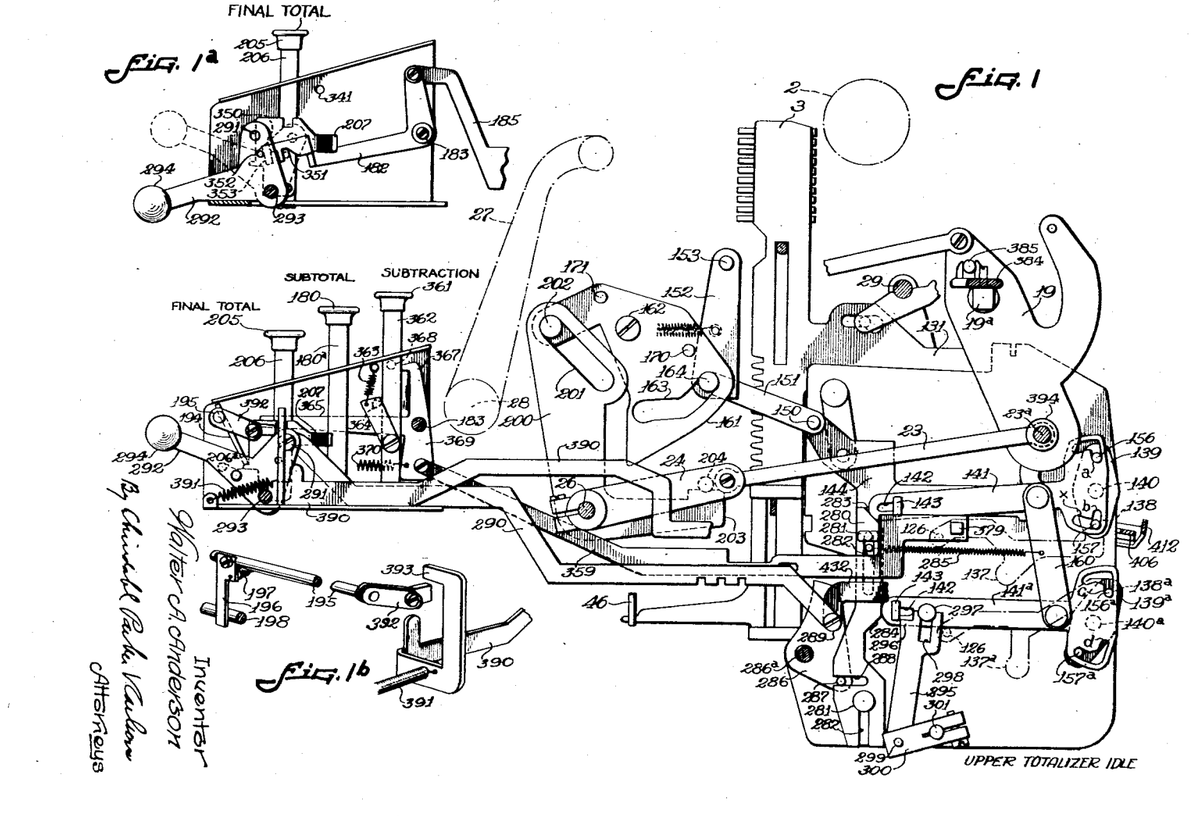
Figure 1 is a fragmental side elevation of a machine embodying the features of my invention, the machine being shown at rest or in the initial position, the upper totalizer being idle.
Fig. 1a is a fragmental view illustrating a locking means for the totalizer-selecting lever.
Fig. 1b is a fragmental perspective view of a means for controlling the spring 391.
Figure 2:
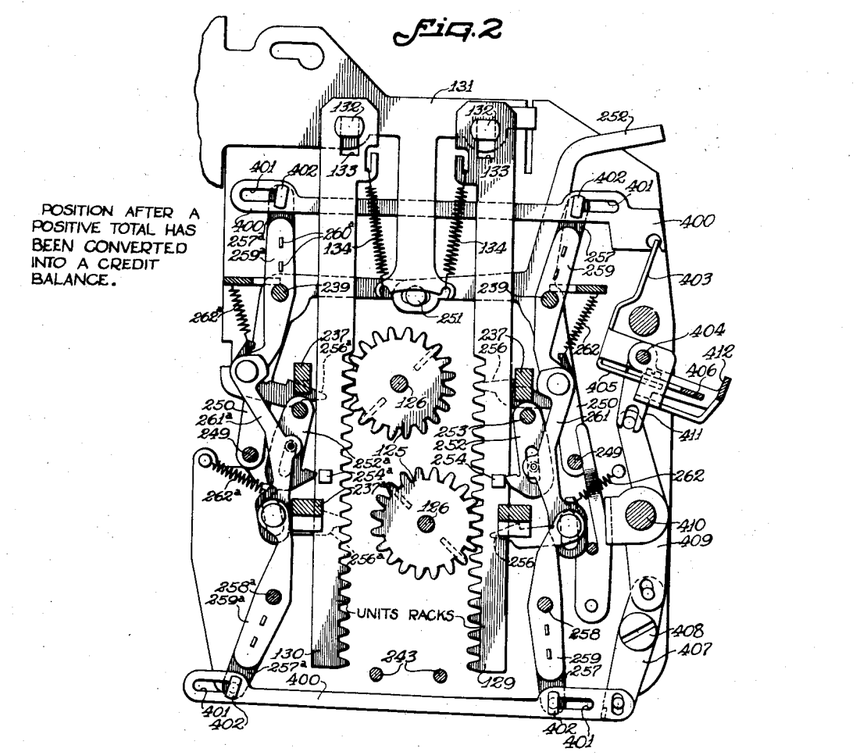
Fig. 2 is a fragmental view showing the units order for the computing mechanism in side elevation.
Figures 13, 13A, 14, 15, 16, 16A:
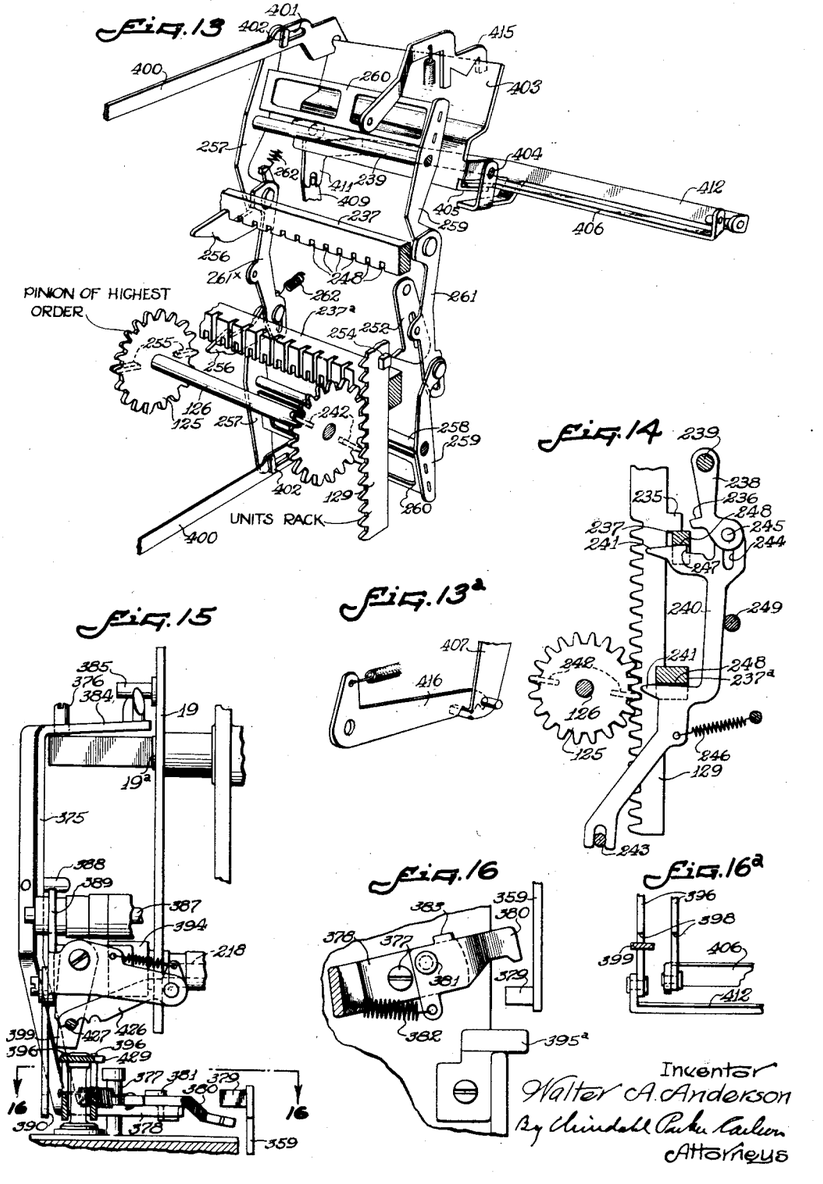
Fig. 13 is a fragmental perspective view illustrating the means for automatically introducing the fugitive unit.
Fig. 13a is a perspective view of a detent for the device for introducing the fugitive unit into the lower totalizer.
Fig. 14 is a fragmental sectional view illustrating the transfer mechanism for the numerical orders intermediate the units order and the highest order.
Fig. 15 is a fragmental rear view illustrating some of the parts shown in Figs. 3 and 4.
Fig. 16 is a horizontal section on line 16—16 of Fig. 15.
Fig. 16a is a fragmental plan view.

The transfer mechanism for carrying amounts from one numerical order to the next high order is best shown in Figs. 2, 13 and 14. There is a set of transfer devices for the racks 129 and a duplicate set for the racks 130. At the end of a cycle the type bars are moved to their normal lower position by the restoring rod 29 (Fig. 1).

The extent of downward movement of the tens and higher racks is limited (except in the transfer operation) by contact of lugs 235 (Fig. 14) on the racks with stop lugs 236. When an amount is to be transferred from one order to the next higher order the stop lug 236 for the rack belonging to such higher order is withdrawn, thereby allowing that rack to descend under the action of its spring 134 (Fig. 2) until its lug 235 stops against a cross bar 237 fixed in the machine frame. The extent of such further descent of the rack is just sufficient to turn the pinion for that rack through the distance of one tooth. Each stop lug 236 is formed on a pawl 238 which is suspended from a pivot 239 in the machine frame. Since both totalizers are never in mesh with the same set of racks at any given time, it is practicable to arrange for the tripping of the pawls 238 by either totalizer. This is effected by means including transfer members 240, each having an upper lug 241 adapted to be engaged by lugs 242 on a pinion in the upper totalizer, and a lower lug 241 arranged to be engaged by lugs 242 on a pinion in the lower totalizer. In the present instance, two diametrically opposite lugs 242 are fixed to each pinion because each pinion has twenty teeth.

The lower ends of the transfer members 240 are mounted to swing upon cross rods 243, and their upper ends have elongated openings 244 to receive headed studs 245 carried by the pawls 238. Individual springs 246 tend to pull the transfer members 240 in the direction to withdraw the stop lug 236 from under the lug 235. The spring 246 is normally restrained by reason of engagement of a shoulder 247 on the transfer member 240 with the bar 237. The transfer members 240 are held against lateral displacement by reason of the fact that they lie in slots 248 in the bar 237 and a similar bar 237a.

When the amount registered by a pinion reaches "9", continued rotation of the pinion as the rack descends brings one of the lugs 242 on the pinion against the lug 241 on the transfer member 240 which is connected to the pawl 238 for the next higher rack, thereby depressing the transfer member 240 until the shoulder 247 is clear of the bar 237, whereupon the spring 246, assisted by the downward pressure of said next higher rack, pulls the transfer member 240 and the pawl 238 away from the last-mentioned rack until the transfer member 240 stops against a restoring rod 249. The lug 236 is then out of the path of said rack of next higher order, and the latter therefore moves down one tooth-space under the influence of its spring 134, the rack being stopped by the bar 237.

After each transfer operation the pawl 238 and the transfer member 240 are restored to their normal position by the rod 249, there being one such restoring rod for each of the sets of transfer mechanisms. Each rod 249 is carried by two bell crank levers 250, one at each side of the set of racks, these levers being pivoted in the framework of the machine on the axis 239. The bell crank levers at each side of the machine are connected for simultaneous swinging movement by a pin-and-slot connection, as shown at 251 in Fig. 2. The restoring rods 249 are simultaneously moved toward each other by means fully described in Patent No. 1,965,611, to restore any transfer members 240 and pawls 238 which may have been concerned in a transfer operation in the last previous cycle of operations.

When the type bars are raised for a printing operation, the racks do no begin to rise until the studs 132 engage the upper ends of the elongated openings 133. Those racks, however, which have descended below the normal position in order to effect transfers, rise practically simultaneously with the type bars and thus are lifted before the stop lugs 236 are restored to normal position by the rods 249. So also the movement imparted to the type bars during the enforced spacing stroke of the handle 27 is sufficient to raise the lugs 235 to permit the placing of the stop lugs 236 thereunder.

It may be here stated that when any pinion stands at zero, one of the lugs 242 on said pinion lies directly beneath one of the lugs 241 (see Fig. 14). Therefore, when a total is to be printed, those racks which mesh with pinions that stand at zero cannot rise, the remaining racks rising until the rotation of their pinions brings the lugs 242 thereon into contact with their respective lugs 241. The type bars are then in position to print the total amount accumulated on the totalizer.

It will be noted that the transfer members 240 are arranged for pivotal movement on the axis of the rods 243, and are arranged for downward movement to disengage the shoulder 247 from the cross bar 237. Each rod 243 is located relatively close to the vertical planes of the pinion shafts so that the pivotal movement imparted to the transfer member 240 by the spring 246 shall carry the lower lug 241 away from the adjacent pinion without any rising movement of said lug 241.

If a debit or positive amount has been accumulated in one of the totalizers, and one or more amounts are subtracted so as to leave a credit or negative total in that totalizer, the true amount of the total cannot be printed until the total in the totalizer has been increased by one unit. Similarly, if a credit or negative total be converted into a debit or positive total by the addition of amounts, the correct total cannot be printed without first adding a unit to the total in the totalizer. In other words, in order that the correct total shall be printed it is necessary to introduce a unit into the totalizer whenever the totalizer has "passed through zero." This is done by causing the appropriate units rack to turn the units pinion one tooth space. In order to effect this result automatically, I have provided the means to be now described.

Duplicate mechanisms are provided, one for the units rack 129 and another for the units rack 130. I will describe the mechanism for the units rack 129, and will apply the same reference numerals with the exponent a to the like mechanism for the units rack 130.

The units rack 129 is arranged to be supported in normal position by means of a pawl 252 (Fig. 2) which is pivoted upon a rod 253 and is arranged to support a stud 254 on said rack. When the "fugitive unit" is to be introduced into one of the totalizers, the pawl 252 is moved out of engagement with the stud 254 of the units rack, whereupon the spring 134 for said rack moves the rack down one tooth space and thus turns the units pinion of that totalizer the same distance. The means for thus moving the pawl 252 at the time said totalizer passes through zero comprises two diametrically opposite lugs 255 (Fig. 13) on the pinion of highest order, said lugs being arranged to engage a dog 256. There are two dogs 256, one for each of the totalizers, said dogs engaging the bars 237 and 237a, respectively. Each dog 256 is pivotally supported upon one end of a lever 257. The upper lever 257 is pivoted on the rod 239, while the lower lever 257 is mounted on a pivot rod 258. Each lever 257 is rigidly connected to a lever 259 by means of a tie-plate 260. The levers 259 are pivoted on the rods 239 and 258, respectively, and are connected by a link 261. The upper end of the link 261 has a simple pivotal connection to the upper lever 259, but the lower end of the link has a pin-and-slot connection to the lower lever 259, so that one of said levers may move without moving the other. The levers 257 are connected by a link 261× which is a duplicate of the link 261. The midportion of the link 261 has a pin-and-slot connection with the pawl 252. Each pair of levers 257 and 259 and tie-plate 260 may be termed a cradle or framework. A spring 262 connected to each of the dogs 256 acts to turn the associated cradle in the direction to withdraw the pawl 252 from the stud 254. In the following cycle the reset rod 249 engages the links 261 and 261× to restore the pawl 252 and the dog or dogs 256 to normal position.

Let it be assumed that the amount "3" has been accumulated in the upper totalizer by operation of the racks 129, the totalizer being therefore in mesh with the racks 129. The units pinion stands with one of its lugs 242 three spaces below the zero position, the corresponding lugs of the other pinions lying directly beneath the lugs 241. The diametrically opposite lugs 242 are above the horizontal plane of the lugs 241. Assuming that 5 is to be subtracted, the pinions are first moved out of mesh with the racks 129, and after the units racks have been raised to the position for registering "5", the pinions are moved into mesh with the racks 130, whereupon the units racks descend, the units rack 130 acting to turn the units pinion five tooth spaces. In the course of such turning movement, one of the lugs 242 on the units wheel is carried into engagement with the end of the lug 241 associated with the tens rack 130, thereby disengaging said lug from the bar 237 and thus allowing said tens rack to descend one tooth space. Said tens rack being in mesh with the tens pinion, the latter is caused to turn through one tooth space, whereby the lug 242 on said tens wheel trips the lug 241 for the hundreds rack, and so on from pinion to pinion. An impulse is thus transmitted from the units pinion to the pinion of highest order so as to place one of the lugs 242 on all the pinions except the units pinion directly below the normal horizontal plane of the lug 241. The rotation thus imparted to the wheel of highest order serves to depress the dog 256a out of engagement with the bar 237, whereupon the corresponding spring 262a moves said dog (as indicated at the upper left-hand side of Fig. 2) in the direction away from the racks. Since the dog 256a is connected to the pawl 252a through the cradle 257a—259a—260a, said pawl is moved out of position to restrain the units rack 130, thus allowing said rack to descend one tooth space, thereby introducing the fugitive unit.

To further illustrate the function of the fugitive-unit-introducing means, let us assume that the upper totalizer is clear and standing in mesh with the racks 129. One set of the transfer lugs 242 will be standing in zero position just below the lugs 241, and the other set of lugs will be standing in "9" position, just above the horizontal plane of the lugs 241. If it be desired to subtract an amount, this may be done without first performing a blank or spacing cycle of operations, for the reason that when the totalizer is shifted into mesh with the racks 130, and the amount accumulated on the required pinions, an impulse will be imparted to the remaining pinions to move from the "9" position to the zero position. As the pinion of highest order passes from "9" to zero position, power will be transmitted to the units rack 130 to introduce the fugitive unit.

Either totalizer may be used alone or both totalizers may be used at the same time for addition or subtraction. The means for determining which totalizer shall be in use or whether both shall be employed includes a slide 280 (Fig. 1) mounted on the slide 144 for vertical movement into three positions. The slide 280 is guided by means of headed studs 281 on the slide 144, said studs lying within vertically elongated openings 282 in the slide 280. On the upper end of the slide 280 is a cam surface 283 adapted to coact with the forward end of the link 141. The slide 280 also has a cam surface 284 to coact with the forward end of the link 141ª. A contractile spring 285 connected to the link 160 urges the links 141 and 141ª toward the slide 280, and places one or the other of the levers 139 and 139ª in upright or totalizer-neutral position except when prevented from so doing by the slide 280.

When the slide 280 is in its lower position, as in Fig. 1, the forward end of the link 141ª is confined between the lower stud 143 and the vertical rear edge of the slide 280, the link 141ª being thus compelled to move back and forth with the slide 144, and the lower totalizer being thereby compelled to move into and out of mesh with one or the other set of racks as the slide 144 is moved back and forth. The spring 285 holds the forward end of the link 141ª against the vertical rear edge of the slide 280. The cam surface 283 allows the spring 285 to hold the lever 139 in upper-totalizer-neutral position, the upper stud 143 playing freely back and forth in the opening 142 as the slide 144 is reciprocated to mesh and demesh the lower totalizer.

When the slide 280 is in its upper position, the lower portion of the slide is out of the way of the link 141ª, consequently the spring 285 holds said link forward, the lever 139ª being thus caused to stand in upright or lower-totalizer-idle position. The lower stud 143 is then free to reciprocate in the slot 142 without causing any movement of the link 141.

Figure 4:
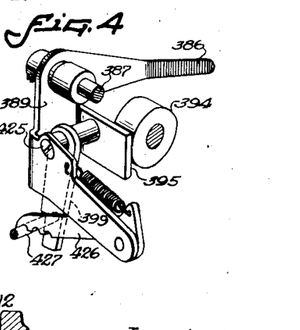
Fig. 4 is a fragmental perspective view looking from the rear of the machine, as indicated by the line 4—4 of Fig. 3.

The means for shifting the slide 280 into any of its three positions comprises a member 286 in the nature of a bell crank lever, said member being pivoted on the axis 286ª. The member 286 carries a pin 287 that lies in a horizontally elongated notch 288 in the slide 280. The member 286 is pivotally connected at 289 to the rear end of a link 290, the forward end of which is pivoted at 291 to a bell crank 292 pivoted at 293. One arm of the bell crank 292 is provided with a finger knob 294. In the present embodiment of the invention the lower totalizer is in use for addition, subtraction or total-taking when the finger knob 294 is in its upper position. When the finger knob is in central position (as in Fig. 4), both totalizers are in use for addition or subtraction, but a total may be taken from the upper totalizer only.

When the slide 280 is in its central position, it exercises no control over the lower totalizer, as said slide is notched so as to allow the spring 285 to hold the link 141ª stationary in the lower-totalizer-idle position. In the reciprocation of the slide 144 the lower stud 143 is free to move idly in the slot 142, hence the lower totalizer remains idle, except when a mechanism to be now described comes into play.

In order to place the lower totalizer in use for addition or subtraction when the slide 280 occupies its central position, I provide means for eliminating lost motion between the link 141ª and the slide 144. Said means comprises a member 295 having a portion 296 arranged to be interposed between the lower stud 143 and a headed stud 297 on the link 141ª. The member 295 has a slot 298 through which the stud 297 extends, the member 295 being thus guided to move up and down so as to place the portion 296 between the studs 143 and 297 or to withdraw said portion. The lower end of the member 295 is pivoted at 299 to a crank arm 300 fixed on a shaft 301 which extends transversely through the machine frame. On the lefthand end of the shaft 301 is a device which virtually constitutes a yieldable crank arm, said device comprising a plate 302 (Fig. 5) fixed on the shaft 301 and a plate 303 pivoted on the plate 302 at 304. A contractile spring 305 is anchored at one end to the plate 302 and is connected at its other end to a pin 306 on the plate 303. The spring 305 normally holds the pin 306 against the adjacent edge of the plate 302, the plates 302 and 303 thus normally moving as a unit. In order yieldingly to hold the member 295 in either of its two positions, and to complete its movement into said positions, I provide a pivoted spring-actuated detent 307 comprising a pin 308 adapted to lie in either of two notches 309 in the plate 302.

To the crank arm composed of the parts 302 and 303 is pivoted at 310 a link 311, the upper end of which is guided for convenience upon a headed screw on the axis 19ª. The link 311 is arranged to be moved up and down to bring the portion 296 (Fig. 1) into and out of effective position by means including a bell crank (see Fig. 6) pivoted in the machine frame to swing on the pivot 312. Said bell crank comprises an arm 313 having an elongated opening 314 to receive a stud 315 on the link 311. The arm 313 carries a member having a yieldable cam surface 316 and a dwell 317 arranged for engagement by a stud 318 fixed on the left-hand lever 19.

The surfaces 316 and 317 are formed upon one arm of a lever 319 (Fig. 7) which is pivoted to the arm 313 at 320. A tension spring 321 stretched between the other arm of the lever 319 and a pin 322 on the arm 313 normally holds said lever 319 with a stop portion 323 on said lever in contact with the pin 315. Rigid with the arm 313 is an upwardly extending arm 324 carrying a dog 325 which is yieldingly held against a stop lug 326 on the arm 324 by a torsion spring 327. On the lever 19 is a stud 328 to engage the dog 325 in the downward movement of said stud. In the upward movement of said stud the dog 325 is free to yield to allow the stud 328 to pass without causing movement of the bell crank 313—324.

It will be seen that the stud 328 is adapted to cause upward movement of the link 311 for the purpose of withdrawing the portion 296 from between the studs 143 and 297, and that the stud 318 is arranged to cause downward movement of the link 311 for the purpose of inserting the portion 296 between the studs 143 and 297 and thus bringing the lower totalizer into use. However, the studs 318 and 328 must not be allowed to exercise control over the lower totalizer when said totalizer should remain idle, as when only the upper totalizer is to be used. I therefore provide means to deprive the studs 318 and 328 of control of the lower totalizer. In the present instance, said means includes a latch 329 (Fig. 5) pivoted at 330 and adapted to engage a notch 331 in the link 311. The latch 329 is yieldingly connected to an operating rod 332 by means of a spring 333 that tends to hold the latch against a collar 334 on the rod. The forward end of the rod is pivoted on a stud 335 on an arm 336 which is pivoted at 337. A contractile spring 338 tends to swing the arm 336 rearwardly so as to push the latch 329 away from the link 311.

The lower totalizer is idle in two cases, namely, when the totalizer-selecting lever 294 is in its lower position (in which the upper totalizer only is in use) and when the totalizer-selecting lever is in its lower or middle position and a total is being taken from the upper totalizer.

Figures 5, 6, 7, 8, 9:
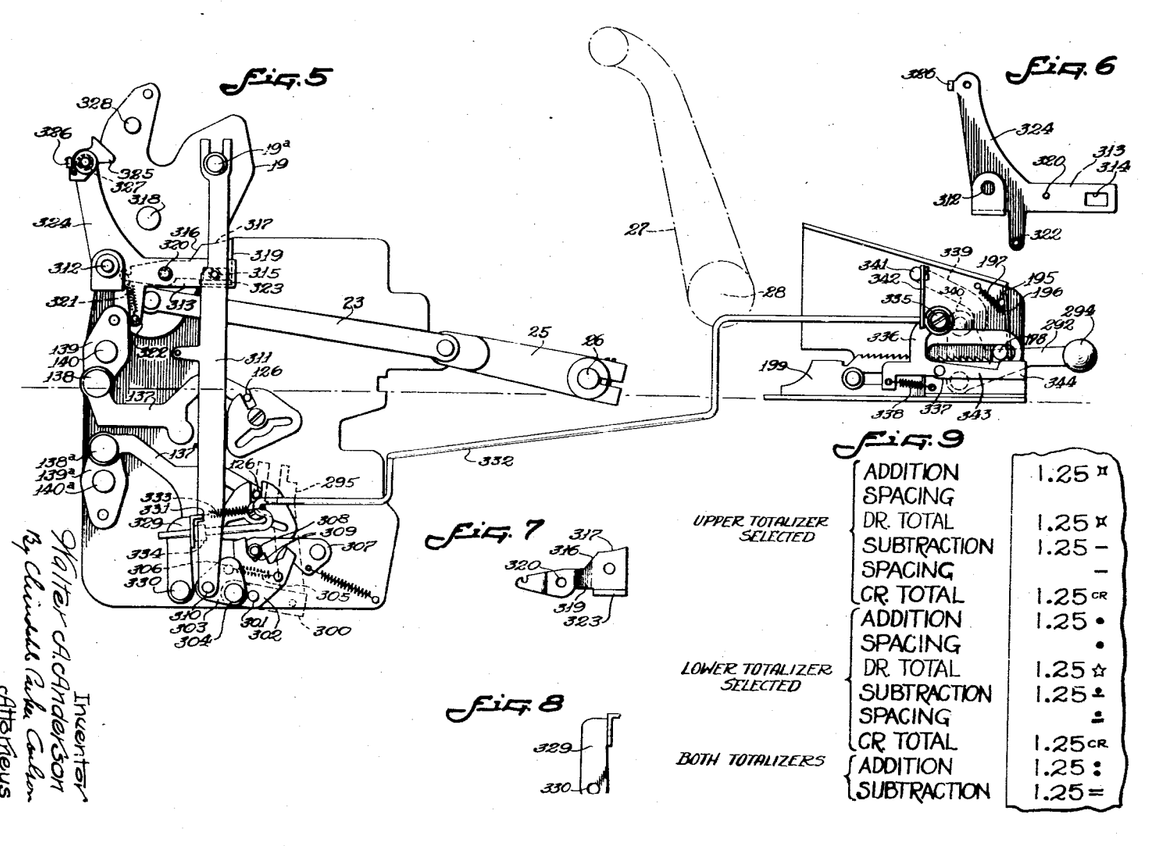
Fig. 5 is a fragmental left-hand side elevation of the machine with the totalizer-selecting lever 294 in its middle or two-totalizer position.
Figs. 6, 7 and 8 are detail views of certain parts shown in Fig. 5.
Fig. 9 illustrates and explains a specimen of work done on the machine.

Means is provided for holding the latch 329 in engagement with the link 311 when the totalizer-selecting lever is in its lower position, which means comprises a cam arm 339 (Fig. 5) arranged to be moved by a stud 340 on the bell crank 292. The cam arm 339 is fixed upon one end of a transverse pivot shaft 341. On the other end of said shaft is an arm 342 (Fig. 5) extending close to the stud 335. When the totalizer-selecting lever is swung to its lower position, the arm 342 draws the rod 332 forward against the tension of the springs 333 and 338. If the latch 329 is not already in engagement with the notch 311, it slips into said notch when the link is raised by the operation of the stud 328 against the dog 325. The member 295 is thus locked in its down position (Figs. 1 and 5). The spring 285 then holds the lower totalizer in idle or neutral position.

When the totalizer-selecting lever 294 is in its central position, the arm 342 stands far enough away from the stud 335 so as not to interfere with the action of the spring 338 that throws out the latch 329.

When the totalizer-selecting lever 294 is in its central position and a total is to be taken from the upper totalizer, the latch 329 must be actuated to lock the member 295 in its down position, so that the lower totalizer shall remain idle. This result is attained in the present embodiment of the invention by making use of the slide bar 199 that serves to restore the differential stops to initial position, as fully explained in the Sundstrand Patent No. 1,198,487, dated September 19, 1916. Rigid with the arm 336 (Fig. 5) is an arm 343 having a cam portion 344 that is held depressed by the roller 178 on the slide bar 199 when the latter is in its forward position. When a digit is set up in the keyboard, the slide bar 199 is moved rearwardly far enough to withdraw the roller 198 from the cam portion 344, thus permitting the spring 338 to withdraw the latch 329, and thus allowing the member 295 to function, and permitting accumulation (i. e., addition or subtraction) in the lower totalizer. When a total is to be taken the slide bar 199 is always in its forward position, hence the latch 329 is held against the link 311 in readiness to slip into the notch 331 during the blank or spacing cycle that precedes the total-taking cycle and therefore the stud 328 is prevented from raising the member 295 into operative position, and the lower totalizer remains idle while the total contained in the upper totalizer is being printed.

It will be seen that the latch 329 is sensitive to the character of the operation to be performed. When an item is set up to be accumulated, the latch is rendered ineffective, thus allowing both totalizers to be used, whereas when a total is to be taken from the upper totalizer or a blank cycle is to be performed the latch is effective to prevent the lower totalizer from being conditioned for use.

Means is provided for preventing the totalizer selecting lever 292 from being shifted from any of its positions after the total key 205 has been depressed. Means of any preferred character, as, for example, that fully disclosed in said Sundstrand Patent No. 1,946,505, may be employed to lock the total key in depressed position. The means herein shown is similar to that disclosed in said patent. To the key stem 206 is fixed the finger 207 that overlies the arm 182. The forward end of the arm 182 has two notches 350 and 351 in its lower edge. On the upwardly extending arm of the bell crank 292 is a stud 352. When said bell crank is in its central position, the stud 352 lies directly below the notch 350. Depression of the total key causes the notched portion 350 to be placed in engagement with the stud 352, thus preventing movement of the totalizer-selecting lever 292 until after the total has been taken. When said lever is in its upper position, as shown in dotted lines in Fig. 1ª, the stud 352 is directly below the notch 351, and thus will be engaged by said notch when the total key is depressed. Similarly, when the lever 292 is in its lower position, the stud 352 is in such position that depression of the total key will place the front edge 353 directly behind said stud and thus prevent the totalizer-selecting lever from being raised.

To prevent the totalizer-selecting lever 292 from being shifted after the handle 11 has been pulled and until the handle has returned to its normal position, means such as that disclosed in my Patent No. 1,975,774 may be employed.

Referring now more particularly to the means for controlling the machine during negative operations, i. e., subtraction and the taking of credit totals. Such control necessitates the shifting of the links 141 and 141ª into position to engage the upper pins 156 and 156ª on the levers 139 and 139ª. It will be seen that such shifting of the links will cause shifting of the field of reciprocation of the totalizers so that each moves into and out of mesh with a different set of racks from that with which it coacts when the links 141 and 141ª are in their lower position. It may be here noted that the links 141 and 141ª tend to assume their lower position.

The means for shifting the links 141 and 141ª from the addition and positive-total plane to the subtraction and credit-total plane comprises a lever 354 (Fig. 12) pivoted at 355 in the machine frame and having a forked rear end which engages a pin 356 on the link 141ª. The lever 354 has a downwardly extending arm carrying a headed stud 357 which extends into a horizontally elongated opening 358 in a link 359. A contractile spring 360 connected at one end to the lever 354 and anchored at its other end to the link 359 tends to move the stud 357 against the rear end wall of the slot 358. The spring 360 thus tends to raise the lever 354 so as to shift the links 141 and 141ª into the subtraction and credit-total position. The spring 360 is controlled by means including a subtraction key 361 (Fig. 1) having a stem 362 which is guided for vertical movement. A contractile spring 363 normally holds the subtraction key elevated. On the stem 362 is a pin 364 that overlies a forwardly extending arm 365 pivoted on the axis 183. The forward end of said arm is arranged to be engaged by the latch finger 194. Rigid with the arm 365 is an upwardly extending arm 367 having an angular end adapted to overlie a pin 368 on the stem 362 when the arm 365 is held by the latch 194. Rigid with the arm 365 is a downwardly extending arm 369 to which the forward end of the link 359 is pivoted. A contractile spring 370 connected to the arm 369 tends to draw said arm forward and thus lower the links 141 and 141ᵃ to the addition and debit-total position. When the subtraction key is depressed the arm 369 is latched by the finger 194 against actuation by the spring 370; thus the subtraction key is held depressed and the link 359 is held in its rearward position, so that through the medium of the lever 354 and spring 360 the links 141 and 141ᵃ are maintained in their upper position.

For the sake of simplicity, I will describe the process of adjusting the machine for subtraction in the upper totalizer, although the process would be the same were either or both totalizers in use.

If an item is to be subtracted in the upper totalizer, the subtraction key 361 is depressed after the item has been set up, thereby pushing the link 359 rearwardly and thus moving the rear end wall of the elongated opening 358 away from the stud 357. (The movement imparted to the link 359 is slightly greater than is necessary to raise the lever 354). When the handle 27 is pulled, the slide 144 is drawn forward, as before explained to withdraw the upper totalizer from the racks 129 before the latter rise. The forward movement of the link 141 causes the lever 139 to turn into upright position, as a result of which the pin 156 is brought into register with the notch a. Thereupon the spring 360 swings the lever 354 upwardly, thus placing the notch a in engagement with the pin 156. At the beginning of the return movement of the handle the link 141 is pushed rearwardly, thereby rocking the lever 139 to place the upper totalizer in mesh with the racks 130. At the end of the return stroke of the handle, the latch finger 194 is disengaged from the arm 365, but the spring 370 cannot pull the lever 354 down, because the surface x of the link 141 rests upon the pin 157. However, the disengagement of the latch finger 194 from the arm 365 allows the springs 360 and 370 to swing the arm 367 rearwardly just far enough to release the pin 368, whereupon the spring 363 restores the subtraction key to its normal position.

If the next item is to be subtracted the subtraction key is again depressed and the same cycle of operations performed. If, however, the next item is to be added, the following operations ensue. When the handle is pulled forward to accumulate the item, the lever 139 is turned to upright position, whereupon the spring 370, acting through the arm 369, the link 359, the rear end wall of the opening 358, the stud 357, and the lever 354, moves the link 141 down so as to place the notch b in engagement with the pin 157. At the beginning of the return stroke of the handle the link 141 is pushed rearwardly by the cam 161, whereby the lever 139 is swung in the direction to place the pinions in mesh with the racks 129.

When there is a credit balance (or negative total or overdraft) in one of the totalizers, and said total is to be printed, it is necessary that the totalizer be prevented from moving (at the conclusion of the blank or spacing stroke) into mesh with the racks used in positive operations of said totalizer. This result could be effected by holding the subtraction key depressed during the spacing stroke. Inasmuch, however, as the operator may not know that the total is negative, means is provided for automatically conditioning the computing mechanism for the printing of a negative total. For manufacturing reasons it is convenient to arrange the last mentioned means to operate through the means which is provided in cross-tabulating machines for automatically setting the computing mechanism to perform subtraction. The last mentioned means comprises a member 375 (Fig. 15) in the nature of a lever pivoted at 376 and 377 in the right-hand portion of the machine frame. Said lever has a lower arm 378 (Fig. 16) adapted to engage a lug 379 on the link 359. The member 375 oscillates in every cycle of the machine, but the link 359 is sometimes held against movement, hence the end of the arm 378 which engages the lug 379 is made capable of yielding, as shown in Fig. 16. The operative portion 380 of the arm 378 is pivoted at 381 and is held in normal position by a spring 382. This position is determined by contact of a lug 383 on the part 380 with the edge of the arm 378.

Figure 3:
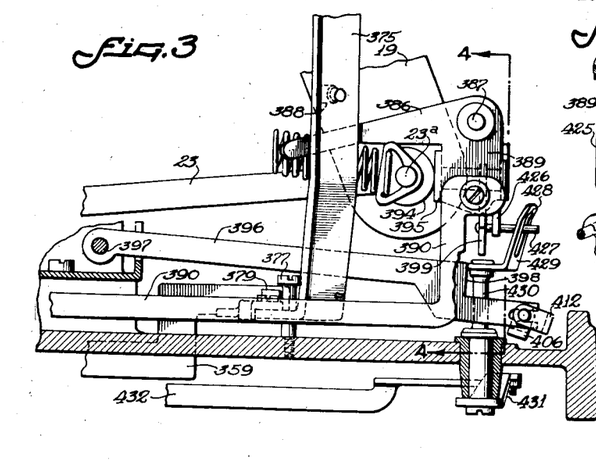
Fig. 3 is a fragmental right-hand side elevation showing a portion of the means for automatically conditioning the totalizers for the taking of credit totals.

The member 375 also comprises an upper arm 384 (Fig. 15) having a forked end which engages a pin 385 on the right-hand lever 19 (Fig. 1). It will be seen that the arm 378 will be oscillated every time the handle 27 is operated. In order that said arm shall engage the lug 379 only when the computing mechanism is to be set for subtraction or credit-total taking, the member 375 is mounted for vertical movement, gravity normally holding said member in its lower position (wherein the inner end 380 of the arm 378 is below the horizontal plane of the lug 379). Means is provided for automatically raising said member 375 to place the inner end of the arm 378 in the horizontal plane of the lug 379. Said raising means comprises a forwardly extending arm 386 (Fig. 3) pivoted in the machine frame at 387 and underlying a stud 388 on the member 375. Rigid with the arm is a downwardly extending arm 389 to which the rear end of a link 390 is pivoted. To the forward end of the link 390 is attached a contractile spring 391 (Fig. 1) which tends to pull the link 390 forward and thus raise the arm 386 and hence the member 375 so as to place the arm 378 in position to set the computing mechanism for the printing of a negative total. When an amount is set up by depression of one or more of the numeral keys, the spring 391 is prevented from drawing the link 390 forward, by means of a stop finger 392 (Fig. 1ᵇ) fixed to the right-hand end of the rock shaft 195, inasmuch as the spring 197 (Fig. 5) turns said shaft so as to raise the stop finger 392 into the path of a lug 393 on the link 390. When no amount is set up in the keyboard (as is the case when a total is to be printed) the roller stud 178 (Fig. 5) holds the stop finger 392 down out of the path of the lug 393, the spring 391 being then restrained by reason of the fact that a roller stud 394 (Figs. 3, 4 and 15) mounted on the axis 23ᵃ normally lies in front of a lug 395 on the arm 389. When the handle is drawn forward to effect printing of the total, the roller stud 394 moves forward, thus allowing the spring 391 to draw the link 390 forward, and thus lifting the arm 378 (Fig. 15) and the member 380, so that in the swinging movement of the lever 375 the link 359 is pushed rearwardly against a stop 395ª (Fig. 16), whereby the selected totalizer is placed or maintained in position to print a negative total.

When the selected totalizer contains a positive total, the spring 391 must be prevented from acting, this result being automatically effected by the means to be now described.

Two independent stop arms 396 (Figs. 3, 15 and 16ª) are pivoted in the machine frame in parallel relation at 397. Each stop arm has a shoulder 398 adapted to be raised into position in front of a finger 399 on the arm 389 and thus restrain the spring 391. Each stop arm is associated with one of the totalizers, and its position depends upon the nature of the total accumulated in its totalizer, the arm being in its upper position when there is a positive total in its totalizer, and being in its lower (ineffective) position when the total is negative. Motion is transmitted from each lever 257, 257ª (Fig. 13) to the associated stop arm 396 by means of a link 400 having elongated openings 401 to receive headed studs 402 on the levers 257, 257ª. The rear end of the upper link 400 is pivotally connected to an arm 403 (Figs. 2 and 13) which is pivoted at 404 in the machine frame. Rigid with the arm 403 is an arm 405 to which is fixed a bar 406 that is pivoted to the rear end of one of the stop arms 396 (see Fig. 16ª).

The lower link 400 (Fig. 2) has a pin-and-slot connection with a lever 407 pivoted at 408 in the machine frame. Said lever has a pin-and-slot connection with a lever 409 pivoted in the machine frame at 410. The upper end of the lever 409 has a pin-and-slot connection with an arm 411 which is pivoted on the axis 404. The arm 411 is integral with a bar 412 which is pivoted to the rear end of the other stop arm 396.

Referring to Fig. 2: When the dog 256ª is tripped to introduce the fugitive unit into the upper totalizer at a time when the latter passes from the positive to the negative condition, the upper link 400 is pushed rearwardly (the stud and slot connection preventing interference with the dog 256), thereby lowering the associated stop arm 396, and thus leaving the spring 391 free to function in a subsequent total-taking cycle. If addition subsequently occurs and the upper totalizer passes from the negative to the positive condition, the dog 256 will be tripped to introduce the fugitive unit, thereby pushing the upper link 400 forward and thus raising the associated stop arm 396 into position to restrain the spring 391. The lower link 400 functions in a similar manner to control the spring 391, but is pushed forward when the lower totalizer passes from the positive to the negative condition, and is pushed rearwardly when the lower totalizer passes through zero in the opposite direction.

The stop arms 396 are yieldingly held in adjusted position by means of spring actuated detents 415 and 416 (Figs. 13 and 13ª). The detent 415 associated with the upper totalizer is like the detent 1094 disclosed in the Sundstrand application Serial No. 118,628. The detent 416 associated with the lower totalizer engages the lever 407.

The finger 399 (Fig. 4) is adjustable into position to coact with the stop arm 396 which is associated with the totalizer from which the total is to be taken. Said finger is pivoted to the arm 389 on the axis 425 and is held in adjusted position by means of a spring-actuated detent 426. Fixed to the finger 399 is a pin 427 that extends into a slot 428 (Fig. 3) in a finger 429 fixed to the upper end of a pivot shaft 430. To the lower end of said pivot shaft is fixed an arm 431 which is connected by means of a link 432 to the bell crank 286 (Fig. 1) at 289. When the totalizer-selecting lever 292 is adjusted to its upper position to select the lower totalizer, the finger 399 will be swung into position directly behind the outer stop arm 396; when the lever 292 is adjusted to its lower position to select the upper totalizer, the finger 399 is swung into place behind the inner stop arm 396; and when the lever 292 is set in midposition to bring both totalizers into use the finger 399 is also in position to engage the inner stop arm 396. It will be remembered that when the lever 292 is in midposition the lower totalizer cannot be used for total-taking, as the latch 329 (Figs. 5 and 8) prevents the interponent 296 (Fig. 1) from coming into use, but a total may be taken from the upper totalizer, as the control slide 280 (Fig. 1) is then in position to take up lost motion between the slide 144 and the link 141; hence the finger 399 is made of such width and form as to be capable of engaging the inner stop arm 396 when the lever 292 is in midposition as well as when said lever is in upper-totalizer position. Thus if a credit total is to be taken from either totalizer, the latter is automatically conditioned for a negative totaling operation.

Means of any preferred character, as, for example, that disclosed in the Sundstrand Patent No. 1,946,505, may be employed to print symbols or signals to denote the nature of the various cycles of operations which may be performed. As shown in Fig. 9, added items are distinguished from subtracted items; the totalizer in which the item has been entered is indicated; and debit totals are differentiated from credit totals.

Any desired means may be used to cause imprints to be made in contrasting colors. Referring to Fig. 9, totals are distinguished from added or subtracted items by being printed in a different color.

While I have described the present embodiment of the invention in considerable detail, it will be understood that the invention is not limited to such details, but that various modifications may be made without departing from the spirit and scope of the invention defined in the appended claims.

Unless qualified, the term "total" is used in the claims to denote either a subtotal or a final total.

I claim as my invention:

1. A computing machine having, in combination, two adding and subtracting totalizers, each having means for automatically introducing a fugitive unit, a single mechanism for taking totals from said totalizers, means for determining from which totalizer the total shall be taken, and means under the control of said determining means for automatically conditioning the selected totalizer for the taking of a negative total when said totalizer contains a negative total.

2. A computing machine having, in combination, two adding and subtracting totalizers, each having means for automatically introducing a fugitive unit, means for taking totals from said totalizers, means for automatically conditioning a selected totalizer for the taking of a negative total when such selected totalizer contains such a total, and manually operable means for placing said conditioning means under the control of the selected totalizer.

3. A computing machine having, in combination, two algebraic totalizers which tend to be conditioned for positive operations, automatic mechanism which tends to condition the totalizers for negative totalling operations, two devices, each sensitive to the positive or negative character of the total in a certain one of the totalizers, for restraining said automatic conditioning mechanism when the total is positive, and means for placing said automatic conditioning means under the control of a selected one of said devices.

4. A computing machine having, in combination, two algebraic totalizers, each having means for automatically introducing the fugitive unit, means for taking totals from said totalizers, means independent of the total-taking means for determining from which totalizer the total shall be taken, and means under the control of said determining means for automatically conditioning the selected totalizer for the taking of a negative total when said totalizer contains a negative total.

5. A computing machine having, in combination, two algebraic totalizers, each having means for automatically introducing the fugitive unit, means including a single subtotal key and a single final total key for taking totals from either of said totalizers, means for determining from which totalizer the total shall be taken, and means under the control of said determining means for automatically conditioning the selected totalizer for the taking of a negative total when said totalizer contains a negative total.

6. A computing machine having, in combination, two algebraic totalizers, each having means for automatically introducing the fugitive unit, means including a single final total key for taking totals from either of said totalizers, means for determining from which totalizer the total shall be taken, and means under the control of said determining means for automatically conditioning the selected totalizer for the taking of a negative total when said totalizer contains a negative total.

7. A computing machine having, in combination, two algebraic totalizers, means for selecting one or the other for total taking, a single mechanism for taking a total from the selected totalizer, and a single mechanism operating during a total taking operation for automatically conditioning the selected totalizer for a negative totaling operation when said totalizer contains a negative total.

8. A computing machine having, in combination, two algebraic totalizers, mechanism operating during a total taking cycle for automatically conditioning either totalizer for negative totaling when such totalizer contains a negative total, two devices, one for each totalizer, for controlling the conditioning mechanism, and means for placing the conditioning mechanism under the control of a selected one of said devices.

9. A calculating machine having amount determining differential mechanism, two registers each capable of addition or subtraction whereby either may reach a positive or negative condition, a "fugitive 1" mechanism operable to selectively enter a "fugitive 1" in either register, means for conditioning certain elements of said machine to selectively perform calculations in either register, and means controlling said "fugitive 1" mechanism in accordance with the conditioning of said machine to cause it to automatically and selectively enter a "fugitive 1" in the register in which calculations are performed.

10. In a machine of the class described, two registers, differential actuating mechanism for adding and subtracting thereon, whereby either register may reach a positive or negative condition, means controlling the co-operation between the registers and the actuating mechanism to enable accumulation in either register selectively, a "fugitive 1" mechanism, and means enabling the latter mechanism to enter a "fugitive 1" in the register in which accumulation is being performed.

WALTER A. ANDERSON.